US012681367B2

(12) United States Patent　　　　　(10) Patent No.: US 12,681,367 B2
Kanes et al.　　　　　　　　　　　　　(45) Date of Patent: Jul. 14, 2026

(54) FOCAL REDUCER

(71) Applicant: Atlas Lens Co., Glendale, CA (US)

(72) Inventors: Dan Kanes, Glendale, CA (US); Merve Cilingir, Glendale, CA (US); Forrest Tanner Schultz, Glendale, CA (US); Duane Scott Dewald, Glendale, CA (US)

(73) Assignee: Atlas Lens Co., Glendale, CA (US)

( * ) Notice: Subject to any disclaimer, the term of this patent is extended or adjusted under 35 U.S.C. 154(b) by 248 days.

(21) Appl. No.: 18/677,769

(22) Filed: May 29, 2024

(65) Prior Publication Data

US 2025/0370319 A1　　Dec. 4, 2025

(51) Int. Cl.
　　*G03B 17/56*　　　(2021.01)
　　*G02B 7/14*　　　(2021.01)
　　*G02B 9/64*　　　(2006.01)
　　*G02B 13/00*　　　(2006.01)

(52) U.S. Cl.
　　CPC ............. *G03B 17/565* (2013.01); *G02B 7/14* (2013.01); *G02B 9/64* (2013.01); *G02B 13/0045* (2013.01); *G02B 13/006* (2013.01); *G02B 13/0095* (2013.01)

(58) Field of Classification Search
　　CPC .................................................. G03B 17/565
　　See application file for complete search history.

(56) References Cited

U.S. PATENT DOCUMENTS

| 4,823,199 | A | * | 4/1989 | Sakakibara | ............ | H04N 23/74 |
| | | | | | | 386/362 |
| 5,499,069 | A | * | 3/1996 | Griffith | ................. | G02B 15/08 |
| | | | | | | 359/675 |

| 7,233,358 | B2 | * | 6/2007 | Yoshikawa | .......... | H04N 23/673 |
| | | | | | | 348/340 |
| 8,903,232 | B1 | * | 12/2014 | Caldwell | ................. | G02B 9/34 |
| | | | | | | 359/686 |
| 9,635,347 | B2 | * | 4/2017 | May | ....................... | G03B 35/02 |
| 11,287,618 | B2 | * | 3/2022 | Neil | ....................... | H04N 23/55 |

(Continued)

FOREIGN PATENT DOCUMENTS

| WO | 99/08154 A1 | 2/1999 |

OTHER PUBLICATIONS

International Search Report and Written Opinion, PCT App. No. PCT/US25/31077, Jul. 18, 2025, 9 pages.

*Primary Examiner* — Leon W Rhodes, Jr.

(74) *Attorney, Agent, or Firm* — Nicholson De Vos Webster & Elliott LLP

(57)　　　　　　　ABSTRACT

A focal reducer for use with a camera and a primary lens moves the image formed by the primary lens farther back within the lens/reducer/camera assembly so that the image of an object within the field of view is formed at the image plane of the camera. Relaying the image from the image plane of the primary lens to the image plane of the camera enables the primary lens and the camera, which have the same type of mount, to be used with a focal reducer. Previously, a primary lens and a camera having the same type of mount could not be used with a focal reducer, because the focal reducer interposed between the primary lens and the camera caused the image plane of the primary lens to be located in front of the image plane of the camera, making it impossible for the lens/reducer/camera assembly to achieve infinity focus.

20 Claims, 4 Drawing Sheets

(56)　　　　　　References Cited

U.S. PATENT DOCUMENTS

2008/0278621  A1　11/2008　Cho et al.
2011/0249966  A1　10/2011　Weber et al.
2013/0064532  A1　 3/2013　Caldwell et al.

\* cited by examiner

SURFACE DATA SUMMARY 400

| Surf | Radius | Thickness | Glass (Nc, Vo) |
|---|---|---|---|
| OBJ | Infinity | Infinity | |
| 1 | Infinity | 20 | |
| 2 | - | 25 | |
| STO | Infinity | 10 | |
| 4 | - | 32 | |
| 5 | Infinity | 0.5 | |
| 6 | 52.4693 | 10 | 1.963000, 24.114400 |
| 7 | -133.603 | 0.4999236 | |
| 8 | 22.1832 | 8.964462 | 1.799516, 42.225007 |
| 9 | 24.58228 | 3.077703 | |
| 10 | 33.57425 | 5.713681 | 1.647689, 33.792883 |
| 11 | 12 | 9.423416 | |
| 12 | 20.82217 | 1.999895 | 1.784723, 25.683446 |
| 13 | 16.86873 | 8.220398 | 1.743196, 49.339444 |
| 14 | -55.10634 | 7.367715 | |
| 15 | -13.38942 | 3.850118 | 1.846660, 23.777940 |
| 16 | 76.34437 | 8.428943 | 1.772499, 49.598371 |
| 17 | -22.91283 | 0.4989439 | |
| 18 | 322.9735 | 7.240862 | 1.834807, 42.725324 |
| 19 | -44.58217 | 0.4999889 | |
| 20 | 40.50575 | 8.457246 | 1.696797, 55.532241 |
| 21 | Infinity | 32.14848 | |
| IMA | Infinity | | |

SURFACE DATA DETAIL 402

| Surface 2 | | Surface 11 | | Surface 16 | |
|---|---|---|---|---|---|
| X Power | 0.003882 | Aperture | Floating | Aperture | Floating |
| Y Power | 0.005809 | Max. Radius | 11.5 | Max. Radius | 14 |
| | | | | | |
| Surface 4 | | Surface 12 | | Surface 17 | |
| Focal length | 40.5 | Aperture | Floating | Coeff on r2 | 0 |
| OPD Mode | 1 | Max. Radius | 13 | Coeff on r4 | -5.6245586e-007 |
| | | | | Coeff on r6 | 8.0362434e-008 |
| Surface 6 | | Surface 13 | | Coeff on r8 | -3.1416039e-010 |
| Aperture | Floating | Aperture | Floating | Coeff on r10 | 1.06872e-012 |
| Max. Radius | 23 | Max. Radius | 12.5 | Coeff on r12 | 0 |
| | | | | Coeff on r14 | 0 |
| Surface 7 | | Surface 14 | | Coeff on r16 | 0 |
| Aperture | Floating | Coeff on r2 | 0 | Aperture | Floating |
| Max. Radius | 23 | Coeff on r4 | 9.3557825e-006 | Max. Radius | 16 |
| | | Coeff on r6 | -1.7823648e-007 | | |
| Surface 8 | | Coeff on r8 | -4.6642925e-010 | Surface 18 | |
| Aperture | Floating | Coeff on r10 | 5.229312e-012 | Aperture | Floating |
| Max. Radius | 18.5 | Coeff on r12 | 0 | Max. Radius | 18 |
| | | Coeff on r14 | 0 | | |
| Surface 9 | | Coeff on r16 | 0 | Surface 19 | |
| Aperture | Floating | Aperture | Floating | Aperture | Floating |
| Max. Radius | 18 | Max. Radius | 12.5 | Max. Radius | 18 |
| | | | | | |
| Surface 10 | | Surface 15 | | Surface 20 | |
| Aperture | Floating | Aperture | Floating | Aperture | Floating |
| Max. Radius | 15 | Max. Radius | 11 | Max. Radius | 20 |
| | | | | | |
| | | | | Surface 21 | |
| | | | | Aperture | Floating |
| | | | | Max. Radius | 20 |

*FIG. 4*

FOCAL REDUCER

BACKGROUND

A lens mount is a mechanical interface between a photographic camera body and a lens. Lens mounts are a feature of camera systems where the camera body allows interchangeable lenses. Examples of such camera systems include rangefinder cameras, single lens reflex (SLR) cameras, single lens mirrorless cameras, and movie cameras.

A lens adapter is a device that enables use of camera and lens combinations from otherwise incompatible systems. The simplest lens adapters, passive lens adapters, provide just a physical connection between the camera and the lens, while active lens adapters also provide electronic connections, enabling communication between the lens and the camera.

Some lens adapters include an integrated optical element called a focal reducer (also called a telecompressor). The focal reducer reduces the focal length of the camera and lens, which provides a wider field of view and enables decreased lens f/# for shorter exposure times.

BRIEF DESCRIPTION OF DRAWINGS

Various examples in accordance with the present disclosure will be described with reference to the drawings, in which:

FIG. 4 presents two tables illustrating an example prescription for the lenses of the focal reducer according to some embodiments.

DETAILED DESCRIPTION

Figure 1:
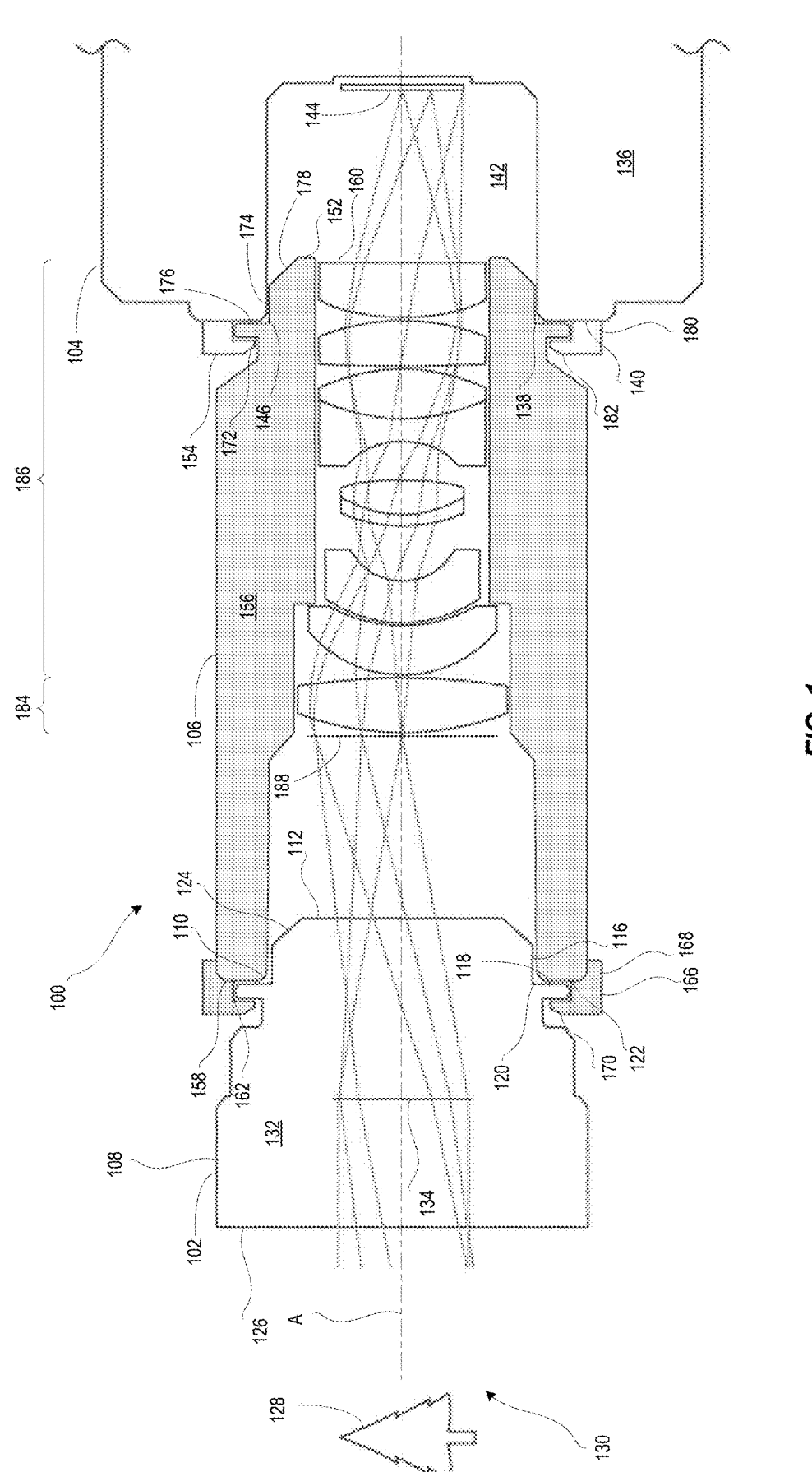
FIG. 1 is a schematic side view illustrating a camera and lens assembly including a focal reducer according to some embodiments.

The present disclosure relates to a focal reducer. According to some embodiments, the focal reducer includes optics that make it possible to use a focal reducer with lens mounts having fixed flange focal distances, where the camera and the lens have a same type of lens mount (e.g., a PL-mount). For a camera with interchangeable lenses, the flange focal distance (FFD) (also known as the flange-to-film distance, the flange focal depth, the flange back distance (FBD), or the flange focal length (FFL)) of a lens mount system is the distance from the mounting flange (the interlocking metal rings on the camera and the rear of the lens) to the film or image sensor plane. This value is different for different camera systems, and is usually measured to a precision of hundredths of millimeters, because even small variations from the FFD will result in an out-of-focus image. For example, the PL-mount from ARRI has an FFD of 52.00 mm, while the PV-mount from Panavision has an FFD of 57.15 mm.

In some cases, lenses can be adapted from one mount type (and respective FFD) to another mount type (and respective FFD), but FFD is an important consideration in determining whether or not a particular type of lens can be adapted to a given camera. Generally, a camera with a shorter FFD can be adapted to a lens with a longer FFD, but a camera with a longer FFD cannot be adapted to a lens with a shorter FFD. For a camera with a shorter FFD and a lens with a longer FFD, an adapter provides the necessary offset so that the image plane of the lens coincides with the film or image sensor plane of the camera when the lens, adapter, and camera are coupled together. But for a camera with a longer FFD and a lens with a shorter FFD, an adapter would only move the image plane of the lens farther away from the film or image sensor plane of the camera. In this case, it is impossible to achieve infinity focus, because the image plane of the lens is located in front of the film or image sensor plane of the camera when the lens, adapter, and camera are coupled together.

For the same reason, up until now a camera having a given type of lens mount could not be used with both a focal reducer and a lens having the same type of lens mount as the camera, because the focal reducer interposed between the lens and the camera prevents the image plane of the lens from aligning with the film or image sensor plane of the camera when the lens, focal reducer, and camera are coupled together. Embodiments of the present focal reducer (also referred to herein as reducer) solve this problem by leveraging optics to effectively translate the image plane of the lens along the optical axis to correct the misalignment between the image plane of the lens and the image plane of the camera when the lens, reducer, and camera are coupled together. For example, some embodiments include a field lens positioned at the image plane of the lens, and a relay and reducing lens positioned behind the field lens such that the image plane of the relay and reducing lens coincides with the image plane of the camera when the lens, reducer, and camera are coupled together.

FIG. 1 illustrates a camera and lens assembly including a focal reducer according to some embodiments. The assembly 100 includes a primary lens 102, a camera 104, and a focal reducer 106 interposed between the primary lens 102 and the camera 104. In the illustrated embodiment, the primary lens 102 includes a housing 108 having a reducer mount 110 at an exit end 112 (the end of the primary lens 102 closest to the camera 104). The reducer mount 110 comprises a male coupler including a reduced-diameter portion 116 and a flange portion 118 extending radially outward from the reduced-diameter portion 116 and spaced from the exit end 112 of the primary lens 102. The reduced-diameter portion 116 is configured to be received within an opening 120 at an entrance end 122 of the focal reducer 106 (the end of the reducer 106 most distant from the camera 104) such that the flange portion 118 abuts the entrance end 122 of the focal reducer 106. The reduced-diameter portion 116 further includes a chamfer 124 to assist in guiding the exit end 112 of the primary lens 102 housing 108 into the opening 120 at the entrance end 122 of the focal reducer 106. In some embodiments, the flange portion 118 may comprise a plurality of flanges spaced circumferentially around the perimeter of the reduced-diameter portion 116. For example, the flange portion 118 may comprise two, three, four, or more flanges that are evenly (or unevenly) spaced about a circumference of the reduced-diameter portion 116.

In the instant specification, components of the camera 104 and lens assembly 100 are described with reference to an entrance end and an exit end. These terms refer to the direction that light rays travel through the camera 104 and lens assembly 100. For example, the primary lens 102 includes an entrance end 126 and the exit end 112 referenced above. Light rays emanating from an object 128 in the field of view 130 of the camera 104 enter the primary lens 102 through the entrance end 126, pass through the primary lens 102, and exit the primary lens 102 through the exit end 112.

The housing 108 of the primary lens 102 is shaped generally as a stepped cylinder. An interior 132 of the housing 108 contains one or more lenses, which are represented schematically as a single paraxial lens located at the exit pupil 134 of the primary lens 102. It is to be understood that the primary lens 102 may include any number of lenses, such as one, two, three, four, or more. Neither the term primary lens, which is singular, nor the single paraxial lens at the exit pupil 134 shown in FIG. 1 should be interpreted to mean that the primary lens 102 includes only one lens. In some embodiments, the primary lens 102 may be an off-the-shelf lens, such as the Sony G Master 50 mm f1.2 E mount lens, which has a FFD of 18 mm, or the Canon RF mount 24-70 mm f2 zoom lens, which has a FFD of 20 mm. In some embodiments, the primary lens 102 may be a movie lens (also known as a cine lens or cinema lens), a still photography lens, or any other type of lens, such as a video camera lens, a scientific/industrial lens, or a security CCTV lens. In some embodiments, the primary lens 102 has an exit pupil that is located at the entrance pupil of the focal reducer 106, rather than at infinity (such as with a telecentric lens).

With continued reference to FIG. 1, the camera 104 includes a body portion 136 having an opening 138 on a front surface 140. In some embodiments, the opening 138 may be generally circular. Behind the opening 138, a generally cylindrical passage 142 leads to an image plane 144 of the camera 104. In some embodiments, the camera 104 is a digital camera, and the image plane 144 represents a digital imager. In other embodiments, the camera 104 is a film camera, and the image plane 144 represents film. The opening 138 forms a portion of a reducer mount 146 comprising a female coupler configured to engage a male coupler at an exit end 152 of the reducer 106. The female coupler further comprises a locking ring 154 that extends around the circumference of the opening 138 and engages the male coupler at the exit end 152 of the reducer 106, as described below. In some embodiments, the camera 104 may be an off-the-shelf camera, such as the Arriflex 435 motion picture film camera, which has a FFD of 52 mm, or the Canon EF C300 Mark II camera, which has a FFD of 44 mm. In some embodiments, the camera 104 may be a cine camera, a video camera, a still camera, or any other type of camera, such as a video camera, a scientific/industrial camera, or a security CCTV camera.

In the illustrated embodiment, the focal reducer 106 comprises a generally tubular cylindrical housing 156 including an entrance end 158 and an exit end 160. The entrance end 158 of the housing 108 includes a lens mount 162 comprising a female coupler configured to engage the male coupler at the exit end 112 of the primary lens 102. In particular, the female coupler comprises the opening 120, which is configured to receive the reduced-diameter portion 116 of the male coupler of the primary lens 102. The female coupler further comprises a locking ring 166 that extends around the circumference of the opening 120 and engages the flange portion 118 of the male coupler of the primary lens 102. In some embodiments, the locking ring 166 comprises an outer ring-shaped body portion 168 and at least one flange 170 that extends radially inward from the body portion 168. For example, the locking ring 166 may include a plurality of flanges 170, such as two, three, four, or more flanges, that are evenly (or unevenly) spaced about a circumference of the ring-shaped body portion 168.

In some embodiments, the number of flanges 170 on the locking ring 168 may be equal to the number of flanges 118 on the male coupler of the primary lens 102, and the pattern of spacings between the flanges 170 on the locking ring 168 may be complementary to the pattern of spacings between the flanges 118 on the male coupler of the primary lens 102, such that when the reduced-diameter portion 116 of the male coupler of the primary lens 102 is inserted into the opening 120 of the female coupler at the entrance end 158 of the reducer 106, the flanges 118 on the male coupler of the primary lens 102 may pass through the spacings between the flanges 170 on the female coupler of the reducer 102 until the flanges 118 on the male coupler of the primary lens 102 abut the entrance end 158 of the reducer 106, as shown in FIG. 1. Rotation of the locking ring 166 about the entrance end 158 of the reducer 106 may then bring the flanges 118 on the male coupler of the primary lens 102 into contact with the flanges 170 on the female coupler of the reducer 102, thereby securing the primary lens 102 to the focal reducer 106 in a friction engagement.

The exit end 152 of the reducer 106 includes a camera mount 172. The camera mount 172 comprises the male coupler, which includes a reduced-diameter portion 174 and a flange portion 176 extending radially outward from the reduced-diameter portion 174 and spaced from the exit end 152 of the reducer 106. The reduced-diameter portion 174 is configured to be received within the opening 138 of the camera body portion 136 such that the flange portion 176 abuts the front surface 140 of the camera body portion 136, as shown in FIG. 1. The reduced-diameter portion 174 further includes a chamfer 178 to assist in guiding the exit end 152 of the reducer 106 into the opening 138 of the camera body portion 136. In some embodiments, the flange portion 176 may comprise a plurality of flanges 176 spaced circumferentially around the perimeter of the reduced-diameter portion 174. For example, the flange portion 176 may comprise two, three, four, or more flanges 176 that are evenly (or unevenly) spaced about a circumference of the reduced-diameter portion 174.

As described above, the female coupler of the camera body portion 136 comprises a locking ring 154 that extends around the circumference of the opening 138 and engages the male coupler at the exit end 152 of the focal reducer 106. Similar to the locking ring 166 at the entrance end 122 of the focal reducer 106, the locking ring 154 of the female coupler of the camera body portion 136 comprises an outer ring-shaped body portion 180 and at least one flange 182 that extends radially inward from the body portion 180. For example, the locking ring 154 may include a plurality of flanges 182, such as two, three, four, or more flanges 182, that are evenly (or unevenly) spaced about a circumference of the ring-shaped body portion 180.

In some embodiments, the number of flanges 182 on the locking ring 154 may be equal to the number of flanges 176 on the male coupler of the reducer 106, and the pattern of spacings between the flanges 182 on the locking ring 154 may be complementary to the pattern of spacings between the flanges 176 on the male coupler of the reducer 106, such that when the reduced-diameter portion 174 of the male coupler of the reducer 106 is inserted into the opening 138 of the female coupler of the camera body portion 136, the flanges 176 on the male coupler of the reducer 106 may pass through the spacings between the flanges 182 on the female coupler of the camera body portion 136 until the flanges 176 on the male coupler of the reducer 106 abut the front surface 140 of the camera body portion 136, as shown in FIG. 1. Rotation of the locking ring 154 about the opening 138 of the camera body portion 136 may then bring the flanges 176 on the male coupler of the reducer 106 into contact with the flanges 182 on the female coupler of the camera body portion 136, thereby securing the focal reducer 106 to the camera 104 in a friction engagement.

In alternative embodiments, the reducer may comprise a bayonet mount at either end. Such embodiments would be configured for engagement with lenses and cameras also having bayonet mounts, such as mirrorless cameras.

Advantageously, the lens mount 162 at the entrance end 158 of the reducer 106 is a same type of mount as the camera mount 172 at the exit end 152 of the reducer 106, where the lens mount 162 is a female coupler of the mount type and the camera mount 172 is a male coupler of the mount type. Similarly, the reducer mount 146 of the camera body portion 136 is a same type of mount as the reducer mount 110 of the primary lens housing 108, where the reducer mount 146 of the camera body portion 136 is a female coupler of the mount type and the reducer mount 110 of the primary lens housing 108 is a male coupler of the mount type. Consequently, the reducer mount 110 of the primary lens 102 is identical to the camera mount 172 of the focal reducer 106, and the lens mount 162 of the focal reducer 106 is identical to the reducer mount 146 of the camera 104. The primary lens 102 is thus capable of being coupled directly to the camera 104 without the focal reducer 106 being interposed between the primary lens 102 and the camera 104. And, because the reducer mount 110 of the primary lens 102 is identical to the camera mount 172 of the focal reducer 106, both have the same flange focal distance.

In some embodiments, the mount type (for the reducer mount 110 of the primary lens 102, the lens mount 162 of the focal reducer 106, the camera mount 172 of the focal reducer 106, and the reducer mount 146 of the camera 104) is an LPL-mount type (LPL: Large Positive Lock, available from ARRI), a PL-mount type (PL: Positive Lock, available from ARRI), or a PV-mount type (available from Panavision). These mount types all have different physical structures, and none are compatible with one another. That is, a lens having a PV-mount cannot be connected to a camera having a PL-mount, at least not without a PV-to-PL adapter. As discussed above, up until now a camera having a given type of lens mount could not be used with both a focal reducer and a lens having the same type of lens mount as the camera, because the focal reducer interposed between the lens and the camera prevents the image plane of the lens from aligning with the film or image sensor plane of the camera when the lens, focal reducer, and camera are coupled together. As discussed below, embodiments of the present focal reducer 106 solve this problem by leveraging optics to effectively translate the image plane of the primary lens 102 along the optical axis A to correct the misalignment between the image plane of the primary lens 102 and the image plane 144 of the camera 104 when the primary lens 102, focal reducer 106, and camera 104 are coupled together.

With continued reference to FIG. 1, the focal reducer 106 further comprises a field lens 184 and a relay and reducing lens 186, both of which are contained within the reducer housing 108. The field lens 184 is spaced from the entrance end 158 of the reducer 106 along the optical axis A and positioned at or near an image plane 188 of the primary lens 102 when the focal reducer 106 is coupled with the primary lens 102. In some embodiments, a small distance between the image plane 188 and the field lens 184 prevents any dust or defects on the field lens 184 from being in focus at the image plane 144, which might occur if the image plane 188 and the field lens 184 were coincident. In the illustrated embodiment, the field lens 184 is a singlet lens having positive refractive power that helps correct aberrations in the focal reducer 106.

In alternative embodiments, the field lens 184 may not be a singlet lens, but may instead comprise multiple lenses. Also in alternative embodiments, the field lens 184 may not be a field lens at all, but may instead be another type of lens that provides one or more desired functions for the focal reducer 106, such as, without limitation, correcting aberrations, changing the size of the image, providing image-space telecentricity, reducing a size of the image sensor, and/or bending or refracting the cone of light from the primary lens 102 back into the relay and reducing lens 186. For simplicity, the field lens 184 is referred to herein as a field lens, even though the field lens 184 may not actually be a field lens in some embodiments.

The relay and reducing lens 186 is also contained within the housing 108 and positioned behind the field lens 184 relative to the entrance end 158 of the reducer 106. An image plane of the relay and reducing lens 186 coincides with the image plane 144 of the camera 104 when the focal reducer 106 is coupled with the camera 104. The relay and reducing lens 186 thus advantageously relays the image formed at the image plane 188 of the primary lens 102 (may be referred to as intermediate image plane 188) to the image plane 144 of the camera 104, while simultaneously reducing the focal length of the camera 104 and the image height of the primary lens 102, which provides a wider field of view and enables increased lens speed for sharper images. These and other advantages of the present embodiments are described below in greater detail.

Figure 2:
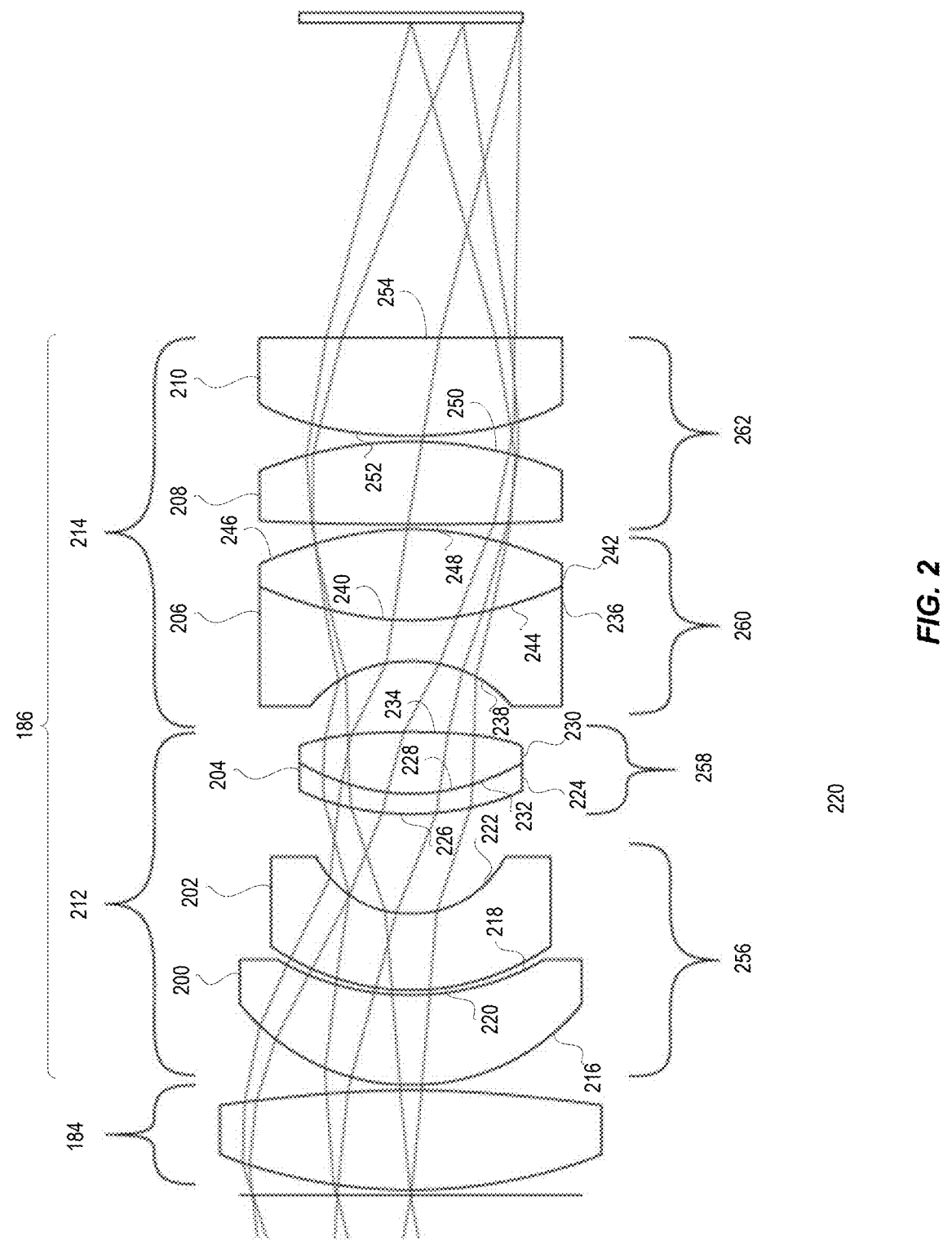
FIG. 2 is a schematic side view illustrating the lenses of the focal reducer of FIG. 1.

FIG. 2 illustrates the lenses of the focal reducer 106 of FIG. 1 in isolation. In the illustrated embodiment, the relay and reducing lens 186 includes multiple lenses. From the entrance end of the reducer toward the exit end 152 of the reducer 106, these lenses include a positive meniscus lens 200, a negative meniscus lens 202, a positive doublet lens 204, a negative doublet lens 206, a first positive singlet lens 208, and a second positive singlet lens 210. The meniscus lenses 200, 202 and the positive doublet lens 204 together form a reducing group 212, and the negative doublet lens 206 and the singlet lenses 208, 210 together form a relay group 214, such that the relay group 214 is located behind the reducing group 212 relative to the entrance end 158 of the reducer 106.

With continued reference to FIG. 2, the reducing group 212 includes the positive meniscus lens 200, the negative meniscus lens 202, and the positive doublet lens 204. The reducing group 212 reduces the focal length of the camera 104 and condenses the image by reducing the image height of the primary lens 102, which provides a wider field of view and enables increased lens speed for sharper images. In various embodiments, the amount of reduction in image height produced by the reducing group 212 may have any value, such as a 0.7× image height reduction (or 0.75×, or 0.63×, or 0.5×, or 0.33×, or any other value).

In general, meniscus lenses (may also be referred to as convex-concave lenses) have two curved surfaces, one with an outward-curved (or convex) face and the other with an inward-curved (or concave) face. In the illustrated embodiment, the positive meniscus lens 200 includes a convex front surface 216 (facing the entrance end of the reducer) and a concave back surface 218 (facing the exit end 152 of the reducer 106), and the negative meniscus lens 202 similarly includes a convex front surface 220 and a concave back surface 222. The two meniscus lenses 200, 202 (may be referred to as meniscus subgroup) together have negative refractive power, while the positive doublet lens 204 (may be referred to as positive doublet subgroup) has positive refractive power.

A doublet is a type of lens made up of two simple lenses (aka singlet lenses) paired together, and may provide a variety of optical advantages, such as reducing chromatic aberration while also reducing spherical aberration and/or other optical aberrations. In the illustrated embodiment, the positive doublet lens 204 includes a first lens element 224 having a convex front surface 226 and a concave back surface 228 and a second lens element 230 having a convex front surface 232 and a convex back surface 234. In some embodiments, the convex back surface 234 of the second lens element 230 may be aspherical, but in other embodiments the convex back surface 234 may be spherical. In some embodiments, the lens elements 224, 230 of the positive doublet lens 204 may be made from materials (e.g., glasses) with different refractive indices and/or different amounts of dispersion. For example, one element may be a positive lens made of crown glass and the other element may be a negative lens made of flint glass (or vice versa).

With continued reference to FIG. 2, the relay group 214 includes the positive doublet lens 204, the negative doublet lens 206, the first positive singlet lens 208, and the second positive singlet lens 210. The relay group 214 relays the image formed at the image plane 188 of the primary lens 102 to the image plane 144 of the camera 104, which advantageously enables the focal reducer 106 to be used with primary lenses and cameras that have the same flange focal distance. As discussed above, up until now primary lenses and cameras having the same flange focal distance could not be used together with a focal reducer, because the length of the focal reducer interposed between the primary lens and the camera would cause the image plane of the primary lens to be located in front of the image plane of the camera, thereby making it impossible for the camera/lens assembly to achieve proper focus. The relay group 214 of the focal reducer 106 reimages the image plane 188 of the primary lens 102 at the image plane 144 of the camera 104, effectively moving the image plane 188 of the primary lens 102 back to the image plane 144 of the camera 104 so that the camera/reducer/lens assembly 100 can achieve proper focus. Simultaneously, the reducing group 212 reduces the focal length of the camera 104 and the image height of the primary lens 102, which provides a wider field of view and enables increased lens speed for sharper images, as described above. In some embodiments, a chief ray angle of the relay and reducing lens 186 at the image plane 144 is similar, or identical, to the chief ray angle of the primary lens 102 at the image plane 144 when the primary lens 102 is coupled directly to the camera 104 without the relay and reducing lens 186. The lens chief ray angle is the angle between the optical axis and the lens chief ray, and the lens chief ray is the ray that passes through the aperture stop of the optical system and the line between the entrance pupil's center and the object point. In general, an entrance pupil is the virtual image of the physical aperture stop, as seen through the front (the object side) of the lens system, and an exit pupil is a virtual aperture in an optical system, and is the image of the aperture stop in the optics that follow it.

In the illustrated embodiment, the negative doublet lens 206 includes a first lens element 236 having a concave front surface 238 and a concave back surface 240 and a second lens element 242 having a convex front surface 244 and a convex back surface 246. In some embodiments, the convex back surface 246 of the second lens element 242 may be aspherical, but in other embodiments the convex back surface 246 may be spherical. In some embodiments, the lens elements 236, 242 of the negative doublet lens 206 may be made from materials (e.g., glasses) with different refractive indices and/or different amounts of dispersion. For example, one element may be a positive lens made of crown glass and the other element may be a negative lens made of flint glass (or vice versa). The first positive singlet lens 208 includes a flat front surface 248 and a convex back surface 250, and the second positive singlet lens 210 includes a convex front surface 252 and a flat back surface 254. The negative doublet lens 206 (may be referred to as negative doublet subgroup) has negative refractive power, while the two positive singlet lenses 208, 210 (may be referred to as positive singlet subgroup) together have positive refractive power. The relay and reducing lens 186 thus includes four subgroups of lenses: the meniscus subgroup 256, the positive doublet subgroup 258, the negative doublet subgroup 260, and the positive singlet subgroup 262, each having negative refractive power, positive refractive power, negative refractive power, and positive refractive power, respectively, from the entrance end 158 of the housing 108 toward the exit end of the housing 108.

In some embodiments, the first and second positive singlet lenses 208, 210 provide field flattening to improve corner performance of the relay and reducing lens 186, and may be referred to as a field flattener subgroup (a subgroup of the relay group 214). Field curvature is an optical characteristic in which objects in a field of view appear sharp only in a certain part(s) of the frame (usually the center). This effect happens because of the curved shape(s) of the optical element(s). A field flattener, also known as a field corrector, helps to eliminate optical aberrations caused by the curvature of the optical elements, and the first and second positive singlet lenses 208, 210 provide this effect for the focal reducer 106.

Figure 3:
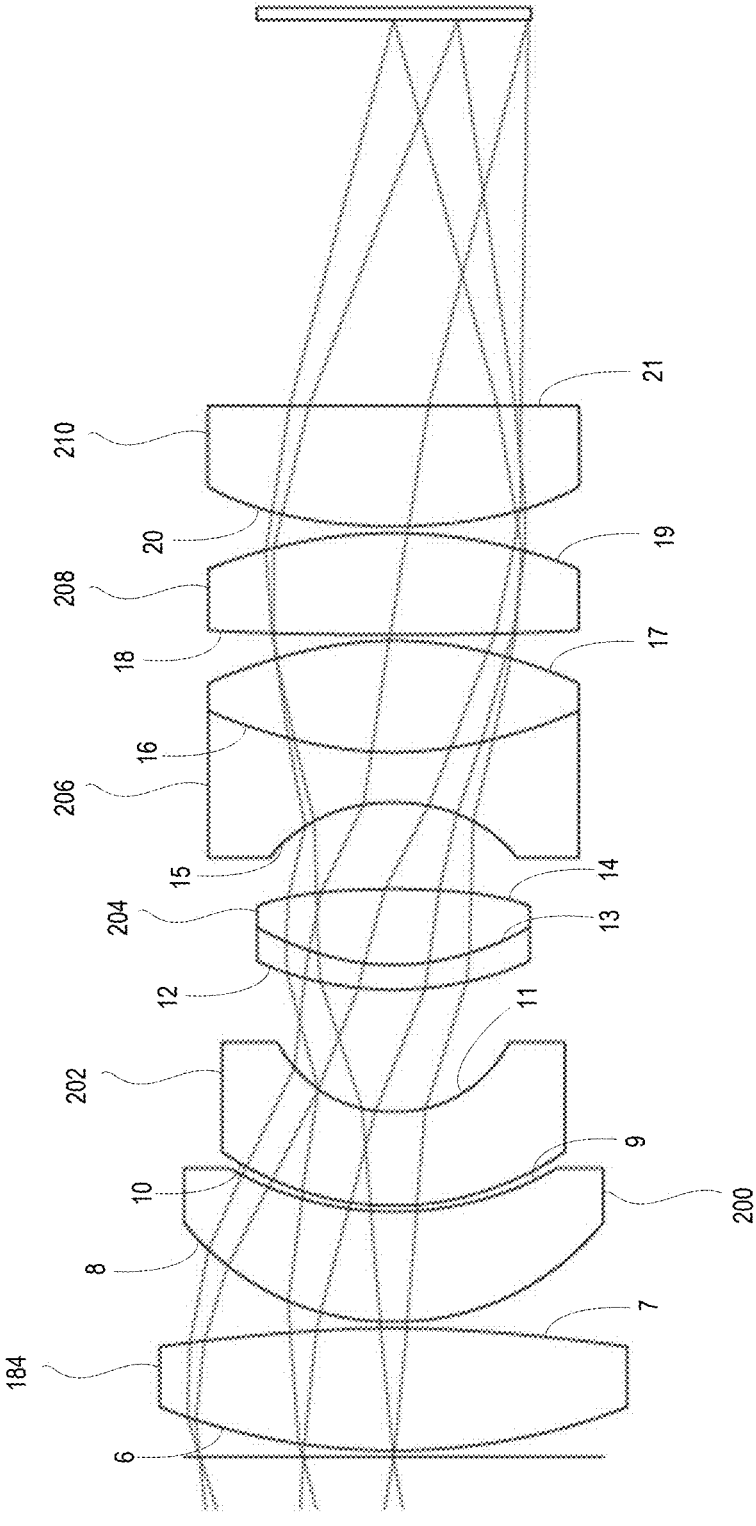
FIG. 3 is another schematic side view illustrating the lenses of the focal reducer of FIG. 1.

FIGS. 3 and 4 illustrate one example prescription for the lenses of the focal reducer 106, where FIG. 3 calls out the lens surfaces and the tables of FIG. 4 indicate the lens types and numerical values for various lens characteristics. In particular, the first table of FIG. 4, labeled SURFACE DATA SUMMARY 400, indicates the lens type, radius of curvature (in mm) for each surface, the distance (in mm) to the following surface (indicated by the column header Thickness), Refractive number (ND), and Abbe number (VD) for each lens surface. In the first column, OBJ indicates object, STO indicates aperture stop surface, and IMA indicates image plane. While not shown in the first table of FIG. 4, surfaces 14 and 17 are aspherical in some embodiments. In optics and lens design, the Abbe number, also known as the V-number or constringence of a transparent material, is an approximate measure of the material's dispersion (change of refractive index versus wavelength), with high values of VD indicating low dispersion. The Refractive number (or refractive index, or refraction index) of an optical medium (in this case a lens) is a dimensionless number that indicates the light-bending ability of the medium. It is a measure of how much light is bent when it passes through that kind of material, with higher Refractive index materials bending light more strongly than lower Refractive index materials. The second table of FIG. 4, labeled SURFACE DATA DETAIL 402, indicates the refractive power (x and y directions), focal length, OPD mode, aperture type, and maximum radius for each lens surface, as well as coefficients of a polynomial equation for aspherical lens surfaces 14 and 17.

As described above, the relay lenses of the relay and reducing lens 186 move the image formed by the primary lens 102 farther back within the lens/reducer/camera assembly 100 so that the image of the object 128 within the field of view 130 is formed at the image plane 144 of the camera 104. Relaying the image from the image plane 188 of the primary lens 102 to the image plane 144 of the camera 104 enables the primary lens 102 and the camera 104, both of which have the same type of mount, to be used with a focal reducer 106. Previously, it was impossible for a primary lens and a camera having the same type of mount to be used with a focal reducer, because the length of the focal reducer interposed between the primary lens and the camera caused the image plane of the primary lens to be located in front of the image plane of the camera, making it impossible for the lens/reducer/camera assembly to achieve infinity focus.

In another example, some embodiments of the present focal reducer 106 are compatible with movie cameras, which require a longer back working distance compared to other types of cameras (e.g., still image cameras, video cameras, etc.). Previous reducers required the camera to have a shorter flange focal distance than the lens, which made them incompatible with movie cameras. Some embodiments of the present focal reducer 106 extend the back working distance and reduce the focal length of the system 100 for motion picture imaging with reflex viewfinder systems. In addition, some embodiments of the present focal reducer 106 maintain a longer back working distance while reducing the field angle and field of view. In another use case, some embodiments of the present focal reducer 106 can be used with a camera having a shorter back working distance to extend that working distance while reducing the focal length of the system. For example, using the present focal reducer 106 a lens having a shorter back working distance can be made retro-focal to work with a reflex mirror camera, thereby expanding the usability of shorter back working distance lenses into longer back working distance lenses while maintaining the field of view. In addition, lenses that previously would not be compatible with movie cameras can be made compatible with such cameras using some embodiments of the present focal reducer 106.

In another example, some embodiments of the present focal reducer 106 enable mirrorless camera lenses from any system to be adapted to mirrorless cameras of any type. For example, a lens with a Nikon Z mount, which has a flange focal distance (FFD) of 16 mm, can be used with a camera having a Canon RF mount, which has a FFD of 20 mm. In another example, some embodiments of the present focal reducer 106 enable bridging of autofocus mirrorless camera lenses to reflex mirror camera systems, for both still and motion picture cameras. For example, a lens with a Sony E mount, which has a FFD of 18 mm, can be used with a reflex mirror film camera having a PL-mount, which has a FFD of 52 mm. In yet another example, the present focal reducer 106 enables a Sony G Master 50 mm f1.2 E mount lens, which has a FFD of 18 mm, to be used with an Arriflex 435 motion picture film camera, which has a FFD of 52 mm. In a still further example, the present focal reducer 106 enables a Canon RF mount 24-70 mm f2 zoom lens, which has a FFD of 20 mm, to be used with a Canon EF C300 Mark II camera, which has a FFD of 44 mm. The latter two examples also have the added benefit of an additional stop of light transmission condensed into the image plane.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

References to "one embodiment," "an embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A focal reducer configured for use with a camera and a primary lens, the focal reducer comprising:
   a generally tubular cylindrical housing including an entrance end and an exit end;
   a lens mount at the entrance end of the housing, the lens mount being a female coupler of a mount type and being configured for coupling with a corresponding male coupler of the mount type on the primary lens;
   a camera mount at the exit end of the housing, the camera mount being a male coupler of the mount type and being configured for coupling with a corresponding female coupler of the mount type on the camera;
   a field lens contained within the housing and positioned to coincide with an image plane of the primary lens when the focal reducer is coupled with the primary lens; and
   a relay and reducing lens contained within the housing and positioned behind the field lens relative to the entrance end of the housing such that an image plane of the relay and reducing lens coincides with an image plane of the camera when the focal reducer is coupled with the camera.

2. The focal reducer of claim 1, the mount type being an LPL-mount type, a PL-mount type, or a PV-mount type.

3. The focal reducer of claim 1, the focal reducer having a same flange focal distance as the primary lens.

4. A focal reducer configured for use with a camera and a primary lens, the focal reducer comprising:
   a housing including an entrance end and an exit end;
   a lens mount at the entrance end of the housing;
   a camera mount at the exit end of the housing;
   a first lens having positive refractive power, the first lens contained within the housing and positioned to coincide with an image plane of the primary lens when the focal reducer is coupled with the primary lens; and
   a second lens contained within the housing and positioned behind the first lens relative to the entrance end of the housing such that an image plane of the second lens coincides with an image plane of the camera when the focal reducer is coupled with the camera.

5. The focal reducer of claim 4, the lens mount and the camera mount being a same mount type.

6. The focal reducer of claim 5, the lens mount being a female coupler of the mount type and being configured for coupling with a corresponding male coupler of the mount type on the primary lens, and the camera mount being a male coupler of the mount type and being configured for coupling with a corresponding female coupler of the mount type on the camera.

7. The focal reducer of claim 5, the mount type being an LPL-mount type, a PL-mount type, or a PV-mount type.

8. The focal reducer of claim 4, the focal reducer having a same flange focal distance as the primary lens.

9. The focal reducer of claim 4, the first lens being a field lens.

10. The focal reducer of claim 4, the second lens including four subgroups of lenses having negative refractive power, positive refractive power, negative refractive power, and positive refractive power, respectively, from the entrance end of the housing toward the exit end of the housing.

11. The focal reducer of claim 4, the second lens including a first doublet having positive refractive power and a second doublet having negative refractive power and located behind the first doublet relative to the entrance end of the housing, both of the first and second doublets having aspheric surfaces facing the exit end of the housing.

12. The focal reducer of claim 4, the second lens including a field flattener group located adjacent the exit end of the housing as part of a relay group to improve corner performance of the second lens.

13. The focal reducer of claim 4, the second lens comprising a relay and reducing lens having a reducing group and a relay group located behind the reducing group relative to the entrance end of the housing.

14. A focal reducer comprising:
   a housing including an entrance end and an exit end;
   a field lens contained within the housing and positioned to coincide with an image plane of a primary lens when the focal reducer is coupled with the primary lens; and
   a relay and reducing lens contained within the housing and positioned behind the field lens relative to the entrance end of the housing, the relay and reducing lens including the relay group and being configured to reimage an output of the field lens with a reduced focal length and image height.

15. The focal reducer of claim 14, the relay and reducing lens including four subgroups of lenses having negative refractive power, positive refractive power, negative refractive power, and positive refractive power, respectively, from the entrance end of the housing toward the exit end of the housing.

16. The focal reducer of claim 14, the relay and reducing lens including a first doublet having positive refractive power and a second doublet having negative refractive power and located behind the first doublet relative to the entrance end of the housing, both of the first and second doublets having aspheric surfaces facing the exit end of the housing.

17. The focal reducer of claim 14, the relay and reducing lens including a field flattener lens group located adjacent the exit end of the housing as part of a relay group to improve corner performance of the relay and reducing lens.

18. The focal reducer of claim 14, further comprising:
   a lens mount at the entrance end of the housing; and
   a camera mount at the exit end of the housing, the lens mount and the camera mount being a same mount type.

19. The focal reducer of claim 18, the mount type being an LPL-mount type, a PL-mount type, or a PV-mount type.

20. The focal reducer of claim 14, the focal reducer having a same flange focal distance as the primary lens.

* * * * *